(12) United States Patent
Mason

(10) Patent No.: US 9,821,621 B2
(45) Date of Patent: Nov. 21, 2017

(54) ADJUSTABLE LENGTH SPRING DIVIDER ON A SHOCK ABSORBER

(71) Applicant: MASON MOTORSPORTS, Lake Elsinore, CA (US)

(72) Inventor: Neal Mason, Lake Elsinore, CA (US)

( * ) Notice: Subject to any disclaimer, the term of this patent is extended or adjusted under 35 U.S.C. 154(b) by 0 days.

(21) Appl. No.: 15/063,052

(22) Filed: Mar. 7, 2016

(65) Prior Publication Data
US 2017/0253102 A1   Sep. 7, 2017

(51) Int. Cl.
| | |
|---|---|
| *B60G 17/02* | (2006.01) |
| *B60G 17/027* | (2006.01) |
| *B60G 11/14* | (2006.01) |
| *B62K 25/04* | (2006.01) |

(52) U.S. Cl.
CPC .......... *B60G 17/0272* (2013.01); *B60G 11/14* (2013.01); *B60G 17/021* (2013.01); *B62K 25/04* (2013.01); *B60G 2202/312* (2013.01); *B60G 2206/42* (2013.01); *B60G 2500/20* (2013.01); *B60G 2800/16* (2013.01)

(58) Field of Classification Search
CPC .. B60G 17/0272; B60G 11/14; B60G 17/021; B60G 2800/16; B60G 2202/312; B60G 2206/42; B60G 2500/20; B62K 25/04
See application file for complete search history.

(56) References Cited

U.S. PATENT DOCUMENTS

| | | | |
|---|---|---|---|
| 3,559,976 A | 2/1971 | Jerz | |
| 3,572,678 A | 3/1971 | Jerz | |
| 5,263,695 A | 11/1993 | Bianchi | |
| 8,317,003 B2 | 11/2012 | Michel | |
| 8,573,573 B2 | 11/2013 | Michel | |
| 9,162,548 B1* | 10/2015 | Wakeman | B62D 21/00 |
| 2006/0163787 A1* | 7/2006 | Munster | B60G 15/065 |
| | | | 267/221 |
| 2009/0302559 A1 | 12/2009 | Doerfel | |
| 2010/0308518 A1* | 12/2010 | Michel | B60G 15/068 |
| | | | 267/218 |
| 2011/0291338 A1 | 12/2011 | Pepka | |
| 2014/0197586 A1* | 7/2014 | Wolf-Monheim | B60G 17/027 |
| | | | 267/218 |

\* cited by examiner

*Primary Examiner* — Drew J Brown

(57) ABSTRACT

An adjustable length spring divider on a coil over shock absorber for a vehicle such as a car, truck or motorcycle. The effective length of the spring divider can be changed with the flip of a switch. The switch activates a piston on the spring divider alternating the piston between a collapse position and an extended position. When in the extended position, the spring divider is effectively longer therefore reducing the force and distance required to compress the springs to a point where the piston contacts the secondary stop on the shock body and reduces the number of springs being used by the shock absorber. The reduction in the number of active springs causes a switch from a lower, primary, spring rate to a higher, secondary, spring rate, where the spring rate can be defined as the amount of weight required to compress the shock absorber one inch.

10 Claims, 4 Drawing Sheets

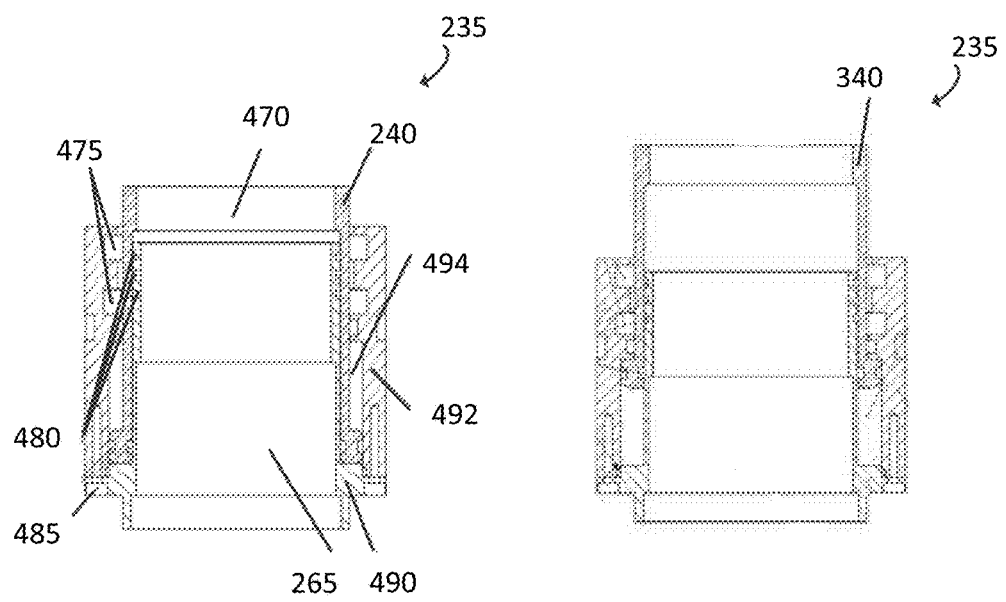

ADJUSTABLE LENGTH SPRING DIVIDER ON A SHOCK ABSORBER

BACKGROUND OF THE INVENTION

1. Field of Invention

The present invention relates to a device and system for absorbing shocks in a vehicle such as a car, truck, or motorcycle, and more specifically, to a shock absorber device and system having an adjustable length spring divider.

2. Description of Related Art

A vehicle, such as a car, truck, or motorcycle, has a suspension that connects and allows motion between the vehicle and its tires. The vehicle's suspension includes shock absorbers, tires, air for the tires, and linkages. The shock absorbers, often referred to simply as shocks or shock dampers, are located on the suspension and are configured to absorb shock impulses of the vehicle. Shock absorbers dampen shock jolts and vibrations by converting the kinetic energy of the shock into other forms of energy such as heat.

Shock absorbers assist with ride quality and vehicle handling. For ride quality, shock absorbers minimize bumps, vibrations, and road noise for a comfortable driving experience. For vehicle handling, shock absorbers improve braking and help the vehicle handle curves in the road.

Some shock absorbers have a spring divider and a threaded secondary stop that controls the tradeoff between ride quality and vehicle handling. Conventionally, a technician manually rotates the secondary stop, which is threaded, away from or towards a spring divider on the shock absorber, controlling a gap size between the spring divider and secondary stop. The spring divider moves up or down as the shock absorbers as the springs are compressed or extended, respectively, decreasing or increasing the gap size between the secondary spring stop and the spring divider, causing the spring rate to transition either earlier or later in the shock stroke.

The technician sets the gap size based on a tradeoff between ride quality and vehicle handling, where the technician increases the gap size by threading the secondary stop up and away from the spring divider to improve ride quality, such as during pleasure driving. Conversely, the technician decreases the gap size by threading the secondary stop down and towards from the spring divider for better vehicle handling, such as during sporty driving. Thus, it is not possible to achieve the best of both vehicle handling and ride quality at the same time since the rotational adjustments are in opposite directions.

A problem with conventional shock absorbers is that these rotational adjustments to the shock absorber, moving the threaded secondary stop up or down the shock absorber, must be done when the vehicle is stopped and the stop is manually adjusted using tools. Typically the vehicle is also turned off when the shock absorber adjustment is made, but at the very least, not while the vehicle is in motion. In other words, conventional shock absorbers do not allow for shock absorber adjustments on the fly, that is, while the vehicle is in motion. As a result, a vehicle owner must make a compromise between vehicle handling and ride quality.

U.S. Patent Publication Number 2009/0302559 by Doerfel is directed to a spring assembly with an adjustable spring rate and a spring strut, where spring struts have a coil spring and a hydraulic shock absorber. The spring assembly includes a master spring, a slide, a stop and at least one auxiliary spring connected in series with the master spring. The position of the slide is adjustable such that, when, during the compression of the spring assembly, the auxiliary spring has overcome a predetermined compression path, the stop strikes against the slide, and a further compression of the auxiliary spring is thereby prevented. The spring assembly has a spring rate that can be adjusted in a simple, fast and precise manner. However, Doerfel falls short because his device only adjusts the overall spring rate not the transition point between two or more spring rates. The Doerfel device also falls short because it requires a custom shock while the present invention can be placed between two springs on a conventional coil-over shock.

SUMMARY OF THE INVENTION

The present invention provides an adjustable length spring divider on a shock absorber for a vehicle such as a car, truck or motorcycle. The effective length of the spring divider can be changed with the flip of a switch. The spring divider uses a piston having an extended position and a collapsed position, where extending the piston to the extended position reduces the distance that the spring divider must travel before contacting the secondary stop and transitioning from a lighter spring rate using two springs to a heavier spring rate using only one spring, where the spring rate can be defined as the amount of weight required to deflect a spring one inch. The result is that with the piston in the extended position, less compression into the shock absorber is required to transition from a primary, lighter spring rate to a secondary heavier spring rate. With the piston in the collapsed position, more compression force and distance, into the shock absorber, is required to change the shock absorber from a primary spring rate that uses all springs to a secondary spring rate that uses fewer spring.

In one embodiment, a system comprises: a vehicle comprising tires; a shock absorber having a shock body having a plurality of ends, one of the plurality of ends coupled to a tire of the vehicle, wherein the shock absorber has a plurality of springs configured to absorb shock impulses of the vehicle, wherein the shock absorber further comprises a spring divider with a piston having a collapsed position and an extended position; and a switch coupled to the piston via a connection, wherein the connection moves the piston between the collapsed position and the extended position upon using the switch.

In another embodiment, a device comprises: a shock body having a plurality of ends, one of the plurality of ends configured to be coupled to a tire of a vehicle; a plurality of springs around the shock body, the plurality of springs configured to absorb shock impulses of the vehicle; and a spring divider having a piston configured to move between a collapsed position and an extended position.

A further embodiment, a method comprises the steps of: operating a vehicle comprising tires, wherein the vehicle comprises a shock absorber having a shock body having a plurality of ends, wherein one of the plurality of ends is coupled to a tire of the vehicle; absorbing shock impulses of the vehicle using a plurality of springs; and switching a piston using a connection, wherein the connection moves the piston between a collapsed position and an extended position.

An advantage of the present invention is that the vehicle operator can perform minor adjustments to where the spring divider contacts the secondary stop, on the fly. Unlike conventional shock absorber adjustments, this piston based shock absorber adjustment can occur regardless whether the vehicle is in motion or not. This is because the piston activation, whether it is through hydraulics, pressurized gas, electronic signals, etc., does not require a technician and tools to manually rotate the secondary spring stop up or down the threaded portion of the shock absorber.

Another advantage of the present invention is that it allows the vehicle to flexibility adjust to changing environmental conditions, whether they be for competitive racing or casual driving. For example, when faced with an environment with potholes, bumps, or hills, one might use a better ride quality mode where the shock absorber functions mostly in the softer primary spring rate mode using dual springs. Conversely, when faced with a windy environment or turns, one might use a sportier mode where the shock absorber functions primarily in the stiffer secondary spring rate mode using only one spring.

A further advantage of the present invention is that the adjustable spring divider provides more options in designing the height of the coil springs in a shock absorber, where the height of the coil springs affect the vehicle's ride height. In a racing environment, the gap size between the secondary stop and the spring divider may be designed to be zero, such that extending the piston increases the ground clearance for off road clearance.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows:

FIG. 4 illustrates a cutaway view of the collapsed position of the piston of an adjustable spring divider of the shock absorber device according to an embodiment of the invention;

FIG. 5 illustrates a cutaway view of the extended position of the piston of the adjustable spring divider of the shock absorber device according to an embodiment of the invention.

DETAILED DESCRIPTION OF EMBODIMENTS

Figure 1:
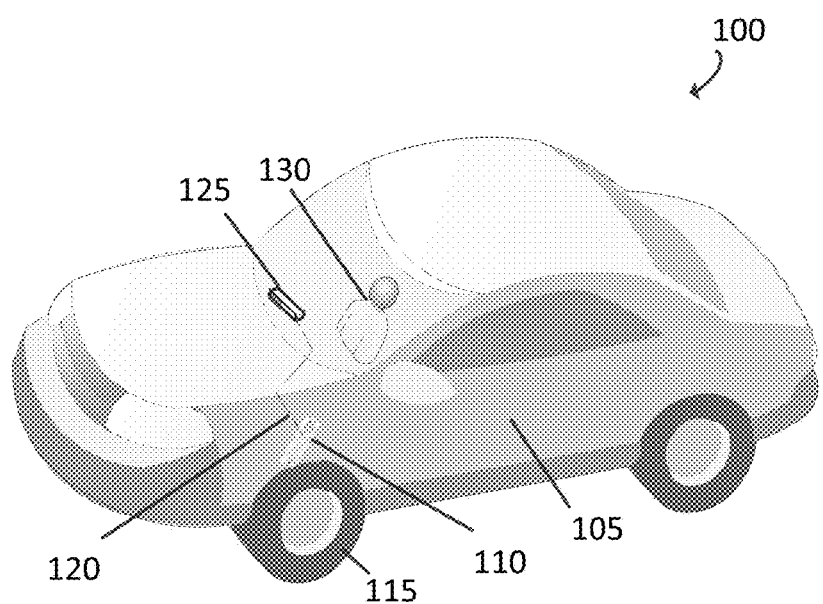
FIG. 1 illustrates a system for adjusting a shock absorber according to an embodiment of the invention.

Further features and advantages of the invention, as well as the structure and operation of various embodiments of the invention, are described in detail below with reference to the accompanying FIGS. 1-6, wherein like reference numerals refer to like elements.

Although the present invention is at times illustrated and described in the context of two springs, one with skill in the art could use three springs, four springs, etc. Additionally, although the present invention is at times illustrated and described a piston shooting "up" from the spring divider to reduce the gap size between the secondary stop and the spring divider, one with ordinary skill in the art realizes that the piston could alternatively shoot "down" from the secondary stop to achieve the same effect of reducing this gap size. By changing the length of the secondary stop, one can change the position at which the spring rate changes from the primary rate to the secondary rate and be referred to as an adjustable secondary stop. Further, although the piston is illustrated as extending up and collapsing down a particular distance, one with ordinary skill in the art realizes that this distance could be increased or decreased to achieve the desired gap size to control the tradeoff between ride quality and vehicle handling.

Embodiments of the present invention relate to a multi rate spring (e.g., dual rate for two springs, triple rate for three springs, etc.) set up on a coil over shock absorber and being able to change the length of a spring divider with the flip of a switch while the vehicle is in motion. By changing the length of the spring divider one can change the position at which the spring rate changes from the primary rate to the secondary rate. The coil over shock absorber with the dual rate spring set up will use two individual coils (e.g., springs) stacked on top of each other and will also use the spring divider and a secondary crossover stop. The spring divider is placed between the two springs and will slide up and down the shock body as the shock and springs are compressed. When the shock is extended to the point that the spring divider is not in contact with the secondary stop then the primary spring rate is in effect. The primary spring rate is the rate that occurs when both springs are being used.

When the shock is compressed enough for the spring divider to contact the secondary stop, regardless whether the piston is in the collapsed position or the extended position, the spring rate now changes, as the secondary spring rate is now in effect. The secondary rate is the spring rate applied when only using one of the two springs, the lower spring, as the upper spring cannot be further compressed beyond the secondary stop, regardless whether the upper spring is fully compressed or not. Typically, the secondary stop is a collar that can be threaded up and down the body of the shock absorber. By moving this up or down on the shock absorber you can change the amount of deflection required until the spring rate switches. To do this the vehicle must be stopped and the stop must be manually adjusted using tools. Embodiments of this invention will allow the length of the spring divider to be changed with the flip of a switch while in motion using hydraulics or pressurized gas in order to change the point in which the secondary spring rate is applied.

By doing this the vehicle can have multiple suspension settings, for example, when the spring divider's piston is collapsed it will be further from the crossover stop allowing a softer ride, while if the spring divider's piston is extended it will be closer to the crossover allowing the spring rate to be stiffer with a more sporty handling. If the springs are set up so that the spring divider contacts/touches/hits the crossover stop at normal vehicle ride height then the adjustable length spring divider can also be used to adjust vehicle ride height on the fly.

FIG. 1 illustrates a system 100 for adjusting a shock absorber 110 according to an embodiment of the invention. The system 100 includes a vehicle 105 having the shock absorber 110 coupled to a tire 115, a connection 120, a switch 125, and a driver 130. The system 100 allows on the fly adjustments to the shock absorber 110 of the vehicle 105, such the driver 130 or another can change the vehicle 105 from a better ride quality mode to a sportier mode of the fly, while the vehicle is in motion.

The vehicle 105 can be any vehicle with shock absorbers such as a passenger car, race car, truck, bus, motorcycle, or scooter, each with one shock absorber per tire. In one embodiment, the vehicle is a Baja off-road racing truck with four shock absorbers, one per tire. In a vehicle racing environment, the owner typically sets the secondary stop to be in contact with the spring divider at ride height for the sporty mode, as that is typically considered the best tradeoff between ride quality and vehicle handling. It is not possible for a race car owner to make rotational shock adjustments during the race itself, as this would require stopping the car and tools for a shock adjustment. Conventionally shock adjustments are rotational adjustments to the threaded secondary stop on shock absorber, increasing or decreasing the gap size between the secondary stop and the spring divider.

The shock absorber 110 is one of a plurality of shock absorbers that assist the vehicle 105 with ride quality and vehicle handling. The shock absorber 110 may also be referred to as a device, shock absorber device, coil over shock absorber, etc. The shock absorber includes a spring divider located a distance away from a threaded secondary stop, referred to herein as a gap size, and the bigger this gap size, the more spring compression from the vehicle 105 is required to get the spring divider to touch the threaded secondary stop, which switches the shock absorber from a primary spring rate to a secondary spring rate, where the primary spring rate provides a softer ride and better ride quality, and secondary spring rate uses a stiffer spring that provides a sportier ride.

Spring rate may be defined as the load, in pounds, divided by the deflection of the spring, in inches, such that the spring rate is the amount of weight required to deflect a spring one inch. Most if not all springs are rated this way, especially coil springs. For example, a spring rated for 700 pounds requires 700 pounds of weight to deflect the spring one inch, 1,400 pounds of weight to deflect the spring two inches, 2,100 pounds to deflect the spring three inches, and so on. For a shock absorber with two 700 pound spring rate springs, the overall spring rate is 350 pounds, as it would take 350 pounds of force to deflect each spring one half inch, or a total of one inch, until the top spring hits the secondary stop such that only the bottom spring is in use, requiring 700 pounds of force to deflect the one spring one inch.

By changing the length of the spring divider one can change the amount of weight or spring compression required to switch between a primary spring rate and a secondary spring rate. The primary rate occurs when the secondary stop and the spring divider are not touching, such that both springs are being used. Conversely, the secondary rate occurs when the secondary stop and the spring divider are touching, such that only the lower spring is being used.

The tire 115, also referred to as a wheel, is coupled to the bottom side of the shock absorber, whereas the weight of the vehicle 105 including the driver 130 is coupled to the top of the shock absorber 110. The springs in the shock absorber 110 can extend or compress based on the upward or downward forces on the tires 115 and vehicle 105. In a bumpy road environment, where the tire is applying upward force on the shock absorber 110 that moves the spring divider up towards and into the secondary stop moving the shock absorber towards or into the secondary spring rate, such that a large gap size would be desirable to keep the shock absorber in the primary spring rate and provide a smoother ride.

The connection 120 between the switch 125 and a piston on the shock absorber 110 can be through hydraulics, pressurized gas, an electronic signal, or another method known by those of skill in the art. In one embodiment, the connection is a hydraulics circuit activated by the switch 125 on a dashboard near the driver 130 and goes to the pistons on the spring dividers of the shock absorbers of all four wheels of a race truck.

A switch 125 is coupled to the piston on the spring divider of the shock absorber 110, through the connection 120, and the switch 125 may be within range of the driver 130. The switch 125 collapses and extends the piston, increasing and decreasing the gap size between the spring divider and the secondary stop, respectfully.

The driver 130 can switch the piston between a better ride quality mode in the collapsed position and a sportier mode with the piston in an extended position based on the environment and the desired suspension characteristics.

Figure 2:
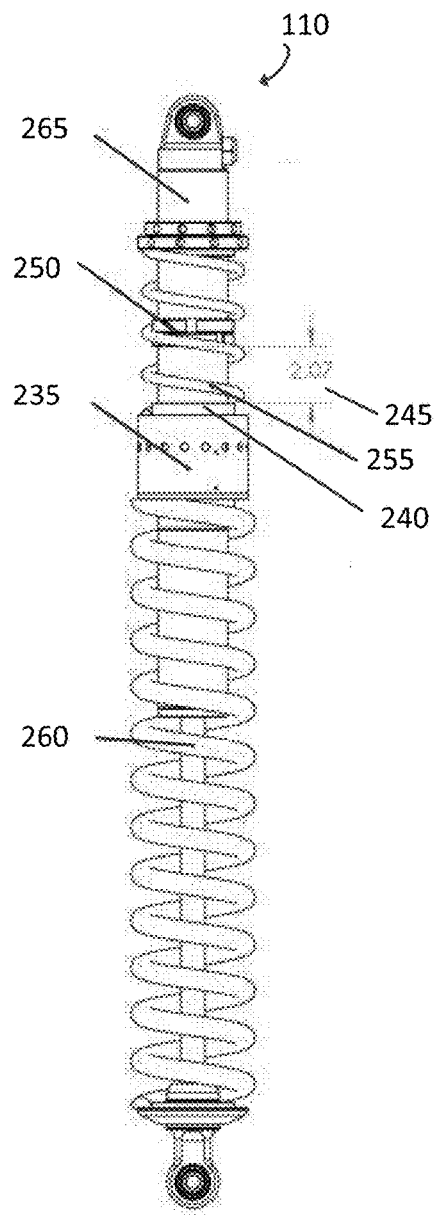
FIG. 2 illustrates a shock absorber device of the system with a piston in a collapsed position according to an embodiment of the invention.

FIG. 2 illustrates the shock absorber device 110 of the system 100 with the piston in a collapsed position 240 according to an embodiment of the invention. The shock absorber 110 includes a spring divider 235 having the piston in a collapsed position 240, a large gap size 245 between the collapsed position 240 and a secondary stop 250, an upper spring 255, a lower spring 260, and a shock body 265.

The spring divider 235 is a moving non-threaded part of the shock absorber 110, which goes over and past the threaded portion of the shock body 265 designed for the secondary stop 250. The spring divider 235 moves down and up the shock body 265 as the shock absorber 110 is extended and compressed, respectfully. Although similar terms are used, note that extending the shock absorber 110 is not the same as moving the piston to the extended position 240. A spring divider can also be referred to as a divider, slider, spring slider crossover stop, or coil divider. A spring divider can be referred to as "crossover", because once it touches the secondary stop, it crosses over from one spring rate to another spring rate. The spring divider 235 is considered to have an adjustable length due to the piston, where the piston effectively changes the length of the spring divider. This change can occur upon the flip of a switch, regardless of whether the vehicle is in motion.

Figure 3:
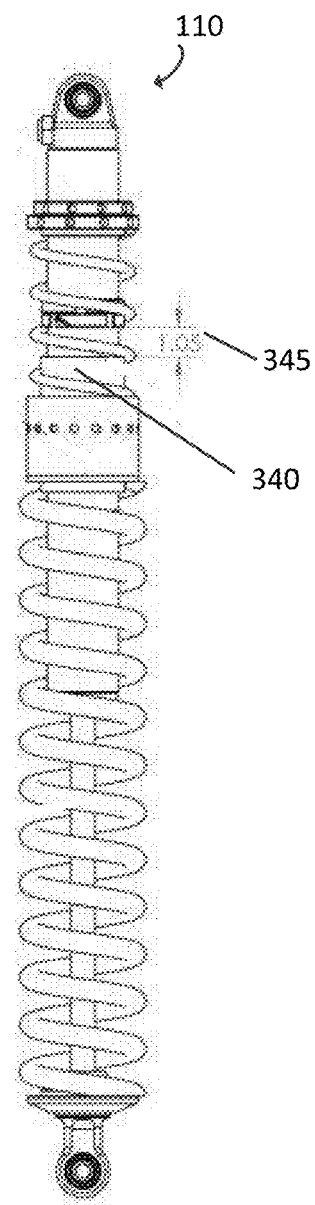
FIG. 3 illustrates the shock absorber device of the system with the piston in an extended position according to an embodiment of the invention.

The spring divider 235, having the piston, controls the compression distance, referred to herein as gap size, required for the shock absorber to switch from the primary spring rate to the secondary spring rate. The piston provides a new and unique way to make shock adjustments. Unlike conventional devices which change the spring rate itself, embodiments of the present invention do not change the spring rate. Instead, the piston effectively makes the spring divider's size or length adjustable. The gap size between the spring divider 235 and a secondary stop 250 can be decreased without changing the spring rate. With a smaller gap size, as illustrated in FIG. 3, it takes less compression by the vehicle and environment to achieve the secondary spring rate. The novel adjustable length spring divider 235 also can be advantageously retrofitted onto existing shock absorbers by replacing their conventional spring divider with the adjustable length spring divider.

Partly for illustration purposes, the collapsed position 240, on the spring divider 235, is illustrated as slightly increasing the effective length of the spring divider 235. In another embodiment, the collapsed position 240 has the piston flush with the spring divider, not changing the length of the spring divider 235, and thus not reducing the gap size between the spring divider 235 and the secondary stop 250. The illustrated embodiment highlights the comparison of the piston in the collapsed position 240, compared to the extended position 340 in FIG. 3. The piston in the collapsed position 240 may also be referred to as being a first position, off, down position, lower position, etc.

A gap size is the distance between a spring divider and a secondary stop. The large gap size 245 represents the distance between the threaded secondary stop 250 and the collapsed piston on the spring divider 235, the gap size labeled here at 2.07 inches. The gap size in this figure is referred to as "large" and shown side by side a small gap size 345 of FIG. 3 to highlight the difference between these two figures, where the piston is in the collapsed position 240 and the extended position 340, respectively. In FIG. 2 the piston is collapsed down in the collapsed position 240, unlike the exact same shock absorber 110 in FIG. 3, where the piston is in the extended position 340 and thus being closer to the secondary stop, forming a small gap size 345 of 1.05 inches. The terms large and small correspond to the piston being collapsed and extended, respectively. One with skill in the art would not limit the invention to the particular gap sizes illustrated in these embodiments.

The secondary stop 250 is located around the shock body 265. A secondary stop can also be referred to as a threaded secondary stop or collar. A secondary stop can be referred to as "secondary" because it initiates the secondary spring rate when it is in touch with the spring divider. A secondary stop can be referred to as "threaded" because a secondary stop must be manually rotationally threaded up or down a shock body, while the vehicle is stopped and typically turned off. Conventionally, this rotational adjustment is how a shock absorber adjustment is made, which increases or decrease the gap size between a secondary stop and a spring divider, which affect how much compressed force on the shock absorber is required for these two components to touch, that is gap size being zero, which changes the spring rate from the primary spring rate to the secondary spring rate, or alternatively stated, changes the shock absorber from using both springs to using one spring. In one embodiment, the secondary stop 250 is used for major suspension changes and the piston is used for minor on the fly suspension changes.

A coil over shock absorber with a dual rate spring set up will use two individual coils stacked on top of each other with a spring divider in between them, with these two coils referred to herein as the upper spring 255 and the lower spring 260. The upper spring 255 and lower spring 260 connect to opposing ends of the spring divider 235. The springs 255, 260 are also referred to as coils, whereas the spring divider 235 is referred to as a divider, because it separates or divides, the top upper spring 255 from the lower spring 260. In this embodiment, the upper spring 255 is illustrated as being thin and the lower spring 260 is illustrated as being thick. In other embodiments, the length, width, and thickness of the spring are of other dimensions.

The shock body 265 provides a threaded means for a secondary stop to be manually rotated up or down. The shock body 265 can also be referred to as a coil shock body. In one embodiment, the shock absorber 110 comprises a coil over shock absorber, which is a spring based shock absorber. A coil over shock absorber includes a shock body, a stop, a spring divider, a top coil, and a bottom coil. The shock body 265 has two ends, with a portion of the body being threaded and surrounded by the secondary stop 250 threaded thereon. Coil over shocks are typically considered a specialty item for high performance vehicles and racing applications due to their high performance characteristics, and thus more common as an aftermarket add-on then original equipment on trucks, cars, and motorcycles.

FIG. 3 illustrates the shock absorber device 110 of the system 100 with the piston in an extended position 340 according to an embodiment of the invention. The piston and remaining components are the same piston in FIG. 2. The difference is that the piston is extended in FIG. 3 as opposed to being collapsed like in FIG. 2. The piston in the extended position 340 may also be referred to as being activated, up, raised, a second position, etc.

The extended position 340 effectively draws the spring divider closer to the secondary stop, forming a small gap size 345. A small gap size requires less compression on the shock absorber 110 to change the spring rate from the primary spring rate to the secondary spring rate because the spring rate switches modes once the secondary stop touches the spring divider, which includes the piston, In the illustrated embodiment, over an inch less (1.02) of force is required to get the shock absorber into the secondary spring rate, and if at a spring rate of 250 pounds (two 500 pound springs), this would require a little more than 250 pounds less force to get to the secondary spring rate.

When the driver 130 or another operator activates the piston to the extended position 340, due to the top of the piston being the top of the spring divider 235, the piston changes the gap size from the large gap size 245 to the small gap size 345. A change in gap size changes the amount of force required to change from a primary spring rate to a secondary spring rate.

FIG. 4 illustrates a cutaway view of the collapsed position 240 of the piston of an adjustable spring divider 235 of the shock absorber device 110 according to an embodiment of the invention. FIG. 4 provides a close-up of the collapsed position 240 and the shock body 265 in FIG. 2. The spring divider 235 includes a slide 470, wiper seal grooves 475, O-ring grooves 480, threaded holes 485, inner cylinder 490, outer cylinder 492, and fluid area 494. The piston is illustrated between the inner and outer cylinders 490, 492.

The slide 470 includes bushing material pressed into the slide 470 on the shock body 265. The wiper seal grooves 475 on both sides of the shock body 265 act as grooves for a wiper seal, and the O-ring grooves act as grooves for O-rings. The threaded holes 485 allow the inner cylinder 490 to be bolted to the outer cylinder 492. The fluid area 494 provides an area pressured with fluid.

FIG. 5 illustrates a cutaway view of the extended position 340 of the piston of the adjustable spring divider 235 of the shock absorber device 110 according to an embodiment of the invention. FIG. 5 provides a close-up of the extended position 340 and the shock body in FIG. 3, with the same components of FIG. 4.

Figure 6:
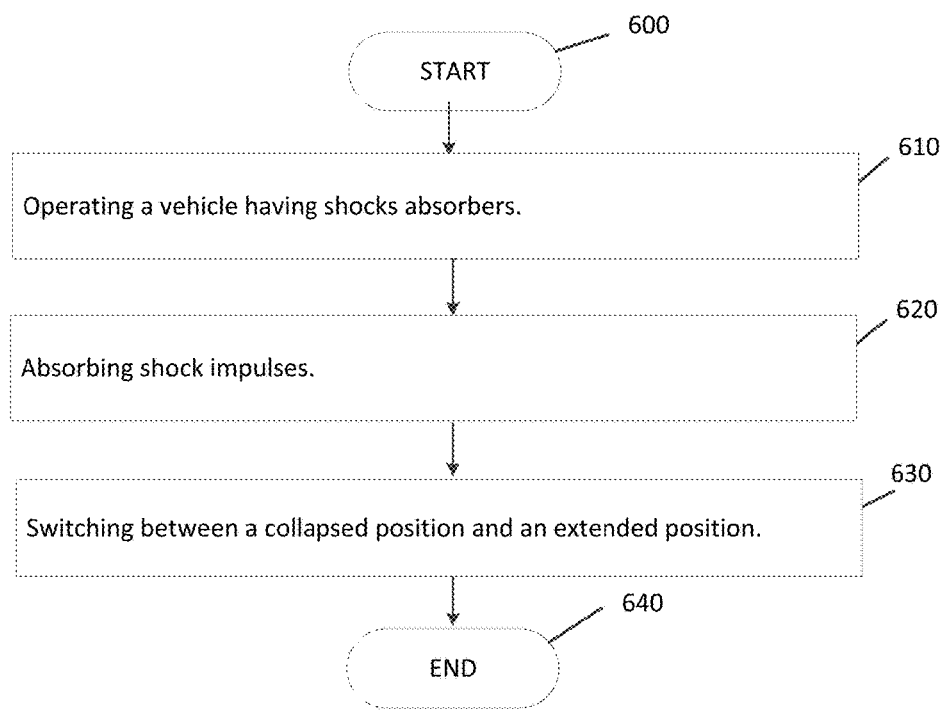
FIG. 6 illustrates a process of using the adjustable length spring divider on the shock absorber according to an embodiment of the invention.

FIG. 6 illustrates a process of using the adjustable length spring divider 235 on the shock absorber 110 according to an embodiment of the invention. The process starts at step 600. At step 610, the driver 130 operates the vehicle 105 having a plurality of shock absorbers. At step 620, the shock absorber 110 absorbs shock impulses caused by the bumps in the ground and weight from the vehicle 105. At step 630, when the driver 130 activates a switch, or by other means, the piston switches between the collapsed position and the extended position. The process may be repeated recursively a number of times and ends at step 640.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A system comprising:
   a vehicle comprising tires;
   a shock absorber having a shock body having a plurality of ends, one of the plurality of ends coupled to a tire of the vehicle, wherein the shock absorber has a plurality of springs configured to absorb shock impulses of the vehicle, wherein the shock absorber further comprises a spring divider with a piston having a collapsed position and an extended position, wherein the plurality of springs comprises an upper spring and a lower spring, wherein the upper spring connects to the piston; and
   a switch coupled to the piston via a connection, wherein the connection moves the piston between the collapsed position and the extended position upon using the switch, wherein moving the piston does not change spring rate.

2. The system of claim 1, wherein the piston is configured to be moved while the vehicle is in motion.

3. The system of claim 1, wherein moving the piston changes a gap size between the spring divider and a secondary stop, wherein the gap size corresponds to a distance until the spring rate changes from a primary spring rate to a secondary spring rate.

4. The system of claim 1, wherein the vehicle comprises a car, a truck, a motorcycle, or a scooter.

5. The system of claim 4, wherein the truck comprises an off road racing truck.

6. The system of claim 1, wherein the connection between the switch and the piston comprises hydraulics.

7. The system of claim 1, wherein the connection between the switch and the piston comprises pressurized gas.

8. The system of claim 1, wherein the connection between the switch and the piston comprises an electronic signal.

9. The system of claim 1, wherein moving the piston between the collapsed position and the extended position changes a gap size between a secondary stop and the spring divider, the gap size representing a length of the upper spring.

10. The system of claim 9, wherein changing the gap size changes an amount of spring compression required to switch between a primary spring rate and a secondary spring rate.

* * * * *